(12) United States Patent
Urbach et al.

(10) Patent No.: US 11,124,223 B2
(45) Date of Patent: Sep. 21, 2021

(54) BEARING FOR A BALL NUT ASSEMBLY OF A VEHICLE POWER STEERING ASSEMBLY

(71) Applicant: TRW Automotive U.S. LLC, Livonia, MI (US)

(72) Inventors: Brian A. Urbach, Rochester Hills, MI (US); John F. Santori, Shelby Township, MI (US)

(73) Assignee: ZF Active Safety and Electronics US LLC, Livonia, MI (US)

( * ) Notice: Subject to any disclaimer, the term of this patent is extended or adjusted under 35 U.S.C. 154(b) by 213 days.

(21) Appl. No.: 16/427,650

(22) Filed: May 31, 2019

(65) Prior Publication Data

US 2020/0377146 A1    Dec. 3, 2020

(51) Int. Cl.
| | |
|---|---|
| *F16H 1/24* | (2006.01) |
| *F16H 55/02* | (2006.01) |
| *B62D 5/04* | (2006.01) |
| *F16C 27/06* | (2006.01) |
| *B62D 3/08* | (2006.01) |

(52) U.S. Cl.
CPC ............. *B62D 5/0448* (2013.01); *B62D 3/08* (2013.01); *F16C 27/066* (2013.01)

(58) Field of Classification Search
CPC ........... B62D 5/0448; F16H 2025/2445; F16C 27/066
See application file for complete search history.

(56) References Cited

U.S. PATENT DOCUMENTS

| | | | | |
|---|---|---|---|---|
| 3,004,803 | A * | 10/1961 | Irwin | F16C 35/047 |
| | | | | 384/495 |
| 6,378,646 | B1 * | 4/2002 | Bugosh | B62D 5/0427 |
| | | | | 180/444 |
| 7,055,646 | B2 | 6/2006 | Bugosh | |
| 8,307,940 | B2 | 11/2012 | Bugosh et al. | |
| 9,376,139 | B2 * | 6/2016 | Laszlo | F16H 25/24 |
| 9,809,245 | B2 * | 11/2017 | Laszlo | B62D 5/0448 |
| 2018/0093699 | A1 * | 4/2018 | Hetzel | B62D 3/08 |
| 2019/0168800 | A1 * | 6/2019 | Urbach | B62D 5/0448 |
| 2019/0316661 | A1 * | 10/2019 | Parker | F16C 11/06 |

\* cited by examiner

*Primary Examiner* — Jake Cook
(74) *Attorney, Agent, or Firm* — Robert James Harwood (57) ABSTRACT

A vehicle power steering assembly includes a housing, a ball nut configured to be operatively disposed in the housing and including an extension portion provided with a convex bearing surface, an insert supported on the housing and provided with a concave bearing surface. The concave bearing surface is complementary to the convex bearing surface. The convex and concave bearing surfaces are a plain bearing configured to provide sliding movement relative to each other. The sliding movement provides relative rotation between the convex and concave bearing surfaces in a first direction on the ball nut axis and a second direction on a rotation axis that is transverse to the ball nut axis.

17 Claims, 5 Drawing Sheets

BEARING FOR A BALL NUT ASSEMBLY OF A VEHICLE POWER STEERING ASSEMBLY

BACKGROUND OF INVENTION

This invention relates in general to vehicle power steering assemblies and in particular to an improved bearing structure for a ball nut assembly of such a vehicle power steering assembly.

An automotive vehicle commonly includes a power steering assembly to assist in turning steerable wheels of the vehicle. The vehicle power steering assembly may include a rack and pinion assembly to convert rotational movement of a steering wheel into linear movement of a steering member. Specifically, a pinion gear is rotated by the steering wheel and the steering member has a rack portion. The steerable wheels are connected by tie rods to opposite ends of the steering member. The linear movement of the steering member then turns the steerable wheels. A ball nut assembly may be mounted on the steering member and operably connected to a power source. Specifically, the power source drives an axially restrained ball nut that is disposed around the steering member. The power source and ball nut assembly together assist in the linear movement of the steering member in response to rotation of the steering wheel.

The vehicle power steering assembly includes a housing for its components. The housing may comprise individual housings that are joined together. For example, the individual housings may be a pinion gear housing and an outboard housing that are joined together. However, tolerances allowed for casting and machining of the individual housings may result in their misalignment when joined together. The misalignment may result in the ball nut assembly binding, which increases internal friction for the vehicle power steering assembly. Thus, it would be desirable to reduce binding in the ball nut assembly due to misalignment of the individual housings.

Furthermore, a rolling or four point bearing having rolling elements—e.g., ball bearings—is typically used to support the ball nut assembly on the housing. However, the rolling bearing has many components such as inner and outer chases, in addition to the rolling elements, that must be provided and assembled. This complexity increases a cost of the rolling bearing that in turn increases a cost of the ball nut assembly. Thus, it would also be desirable to have a simpler support for the ball nut assembly on the housing to reduce the cost of the ball nut assembly.

SUMMARY OF INVENTION

This invention relates to an improved bearing structure for a ball nut assembly of a vehicle power steering assembly.

According to one embodiment, a vehicle power steering assembly may comprise, individually and/or in combination, one or more of the following features: a housing, a ball nut configured to be operatively disposed in the housing, the ball nut including an extension portion provided with a convex outer bearing surface, an insert supported on the housing, the insert provided with a concave inner bearing surface. The concave inner bearing surface is complementary to the convex outer bearing surface. The convex outer bearing surface and concave inner bearing surface are configured to provide relative sliding movement between the convex outer bearing surface and the concave inner bearing surface.

According to this embodiment, the concave inner bearing surface may be in contact with the convex outer bearing surface and the concave inner bearing surface and the convex outer bearing surface may slide on each other.

According to this embodiment, the concave inner bearing surface and the convex outer bearing surface may be a plain bearing.

According to this embodiment, the extension portion may be formed integrally with the ball nut.

According to this embodiment, the extension portion may extend radially outward from an end of the ball nut.

According to this embodiment, the convex outer bearing surface supported on the concave inner bearing surface may axially restrain the ball nut along an axis of the ball nut.

According to this embodiment, the insert may be formed of a polymer material.

According to this embodiment, the vehicle power steering assembly may further include a retention member configured to retain the insert in the housing.

According to another embodiment, a vehicle power steering assembly may comprise, individually and/or in combination, one or more of the following features: a housing, a ball nut configured to be operatively disposed in the housing, the ball nut including an extension portion provided with a convex bearing surface, an insert supported on the housing, the insert provided with a concave bearing surface, and a ball nut axis of the ball nut on which the ball nut is configured to rotate to effect linear motion of a steering member. The concave bearing surface is complementary to the convex bearing surface. The convex and concave bearing surfaces are configured to provide sliding movement relative to each other to provide relative rotation between the convex and concave bearing surfaces in a first direction on the ball nut axis and a second direction on a rotation axis that is transverse to the ball nut axis.

According to this embodiment, the rotation axis may be perpendicular to the ball nut axis.

According to this embodiment, the concave bearing surface may be in contact with the convex bearing surface and the concave bearing surface and the convex bearing surface slide on each other.

According to this embodiment, the concave bearing surface and the convex bearing surface may be a plain bearing.

According to this embodiment, the extension portion may be formed integrally with the ball nut.

According to this embodiment, the extension portion may extend radially outward from an end of the ball nut.

According to this embodiment, the concave bearing surface supported on the convex bearing surface may axially restrain the ball nut along the ball nut axis.

According to this embodiment, the insert may be formed of a polymer material.

According to this embodiment, the vehicle power steering assembly may further include a retention member configured to retain the insert in the housing.

According to yet another embodiment, a vehicle power steering assembly may comprise, individually and/or in combination, one or more of the following features: a housing, a recess in the housing, a ball nut configured to be operatively disposed in the housing and including an extension portion provided with a convex bearing surface, an insert supported in the recess and provided with a concave bearing surface, and a retention member configured to retain the insert in the recess. The ball nut has a ball nut axis on which the ball nut is configured to rotate to effect linear motion of a steering member. The extension portion is formed integrally with the ball nut and extends radially outward from an end of the ball nut. The concave bearing surface is complementary to the convex bearing surface and the convex and concave bearing surfaces are a plain bearing. The plain bearing provides relative rotation between the convex and concave bearing surfaces in a first direction on the ball nut axis and a second direction on a rotation axis that is transverse to the ball nut axis.

According to this embodiment, the concave bearing surface may be in sliding contact with the convex bearing surface.

According to this embodiment, the convex bearing surface being supported on the concave bearing surface may axially restrain the ball nut along the ball nut axis.

One or more potential and/or realized advantages of an embodiment of the bearing structure for a ball nut assembly of a vehicle power steering assembly include reductions of binding and cost for the ball nut assembly.

DETAILED DESCRIPTION OF THE PREFERRED EMBODIMENT

Figure 1:
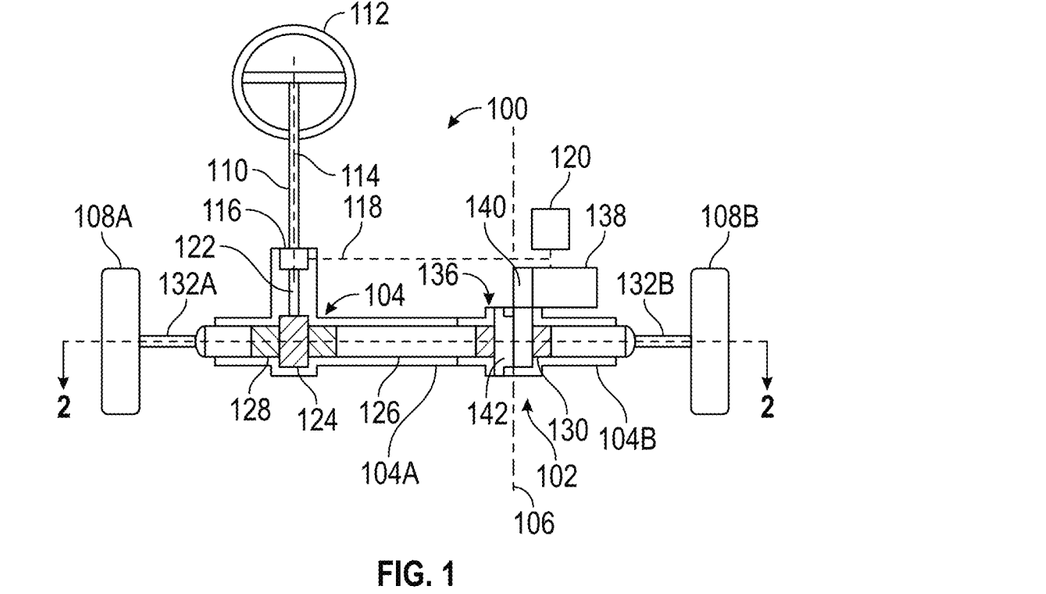
FIG. 1 is a schematic view of a vehicle power steering assembly having a bearing structure, in accordance with the present invention, for a ball nut assembly.
Figure 2:
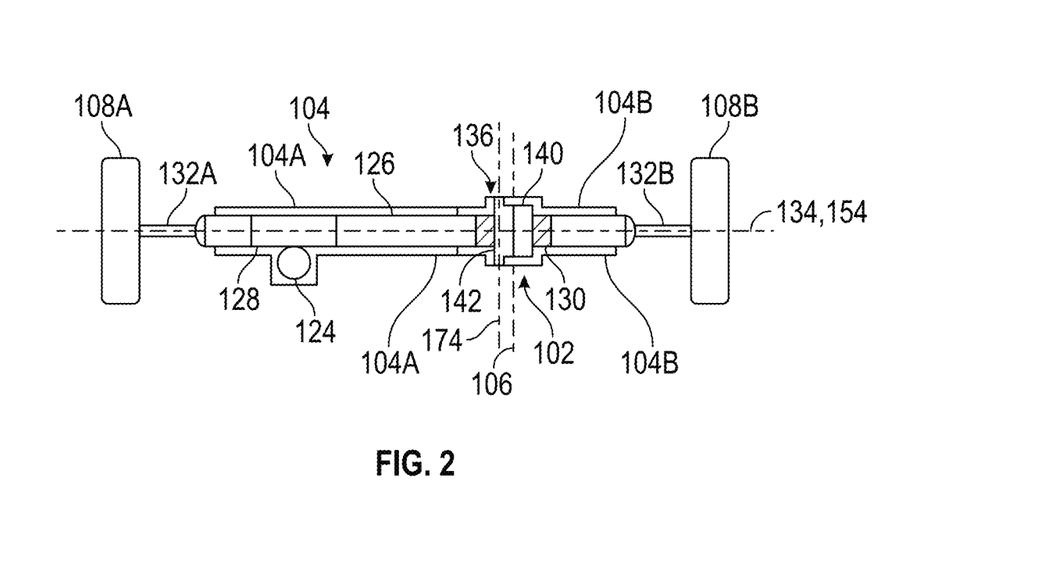
FIG. 2 is a section view taken along line 2-2 of FIG. 1.

Referring now to FIGS. 1 and 2, there is schematically illustrated a power steering assembly, indicated generally at 100, for a vehicle. The vehicle power steering assembly 100 has a ball nut assembly, indicated generally at 102, produced in accordance with the present invention.

The general structure and operation of the vehicle power steering assembly 100 is conventional in the art. For example, the vehicle power steering assembly 100 may be as disclosed by U.S. Pat. No. 8,307,940 to Bugosh et al. or U.S. Pat. No. 7,055,646 to Bugosh, the disclosures of both of which are hereby incorporated by reference in entirety herein. Thus, only those portions of the vehicle power steering assembly 100 which are necessary for a full understanding of this invention will be explained and illustrated in detail. Although this invention will be described and illustrated in connection with the particular vehicle power steering assembly 100 disclosed herein, it will be appreciated that this invention may also be used in connection with other types of vehicle power steering assemblies, including other electric, hydraulic, or otherwise powered vehicle power steering assemblies known to those skilled in the art.

As will be discussed, components of the vehicle power steering assembly 100, including the ball nut assembly 102, are housed within, and supported by, a housing, indicated generally at 104. As illustrated, the housing 104 comprises first and second individual housings 104A and 104B, respectively, that have been joined together to form the housing 104 at a housing interface 106 (indicated by a dashed line). The first and second individual housings 104A and 104B, respectively, are joined together at the housing interface 106 by a known means. As non-limiting examples, the first and second individual housings 104A and 104B, respectively, may be joined together by a press fit, welding, bolts, or screws. Alternatively, the housing 104 may comprise more than the two individual housings illustrated. Alternatively, the ball nut assembly 102 may be utilized with the housing 104 when the housing 104 is a single, unitary housing not comprised of individual housings.

The vehicle power steering assembly 100 is associated with first and second steerable wheels 108A and 108B, respectively, of a vehicle and includes a rotatable input shaft 110. A vehicle steering wheel or input 112 is operatively coupled to the input shaft 110 for rotation therewith about a steering axis 114. A torque sensor 116 is located within the housing 104. The torque sensor 116 generates signals in response to rotation of the input shaft 110. The signals are transmitted over a data network 118 to an electronic control unit (ECU) 120. The signals indicate a direction and magnitude of steering torque applied to the steering wheel 112.

A torsion bar 122 connects the input shaft 110 to a pinion gear 124, which is located inside the housing 104. The torsion bar 122 twists in response to the steering torque applied to the steering wheel 112. When the torsion bar 122 twists, relative rotation occurs between the input shaft 110 and the pinion gear 124.

Alternatively, as a non-limiting example, the input shaft 110, steering wheel 112, torque sensor 116, torsion bar 122, and/or pinion gear 124, along with other associated components or hardware thereof, may be omitted when the vehicle power steering assembly 100 is used with an autonomous or otherwise self driving vehicle. In such a case, steering may be effected only by the ball nut assembly 102.

A linearly moveable steering member 126 is at least partially in, and extends linearly or axially through, the housing 104. The steering member 126 extends linearly between the first and second steerable wheels 108A and 108B, respectively. A rack portion 128 of the steering member 126 is provided with a series of rack teeth which meshingly engage with pinion teeth provided on the pinion gear 124 to operatively connect the pinion gear 124 and the rack portion 128. The steering member 126 further includes a first or inner screw portion 130 having an external screw thread convolution.

The steering member 126 is connected to the first steerable wheel 108A by a first tie rod 132A and the second steerable wheel 108B by a second tie rod 132B. The first and second tie rods 132A and 132B, respectively, are located at distal ends of the steering member 126. The steering member 126 and the first and second tie rods 132A and 132B, respectively, are moveable relative to the housing 104. The linear movement of the steering member 126 along a housing design axis 134 results in steering movement of the first and second steerable wheels 108A and 108B, respectively, in a known manner. The housing design axis 134 is an axis the housing 104 is designed to align with. However, allowable tolerances allow an as-built axis (not shown) along which the assembled housing 104 actually aligns with to deviate from the housing design axis 134.

The ball nut assembly 102 is housed in the housing 104 and includes a bearing structure, indicated generally at 136. The ball nut assembly 102 is supported on the housing 104 by the bearing structure 136. The bearing structure 136 will be discussed in detail with reference to FIGS. 3-6B. As will also be discussed in detail, the bearing structure 136 is of a plain bearing type.

The vehicle power steering assembly 100 further includes a power source 138 drivably connected to the ball nut assembly 102. The power source 138 is illustrated as an electric motor, but may be other than an electric motor. As a non-limiting example, the power source 138 may be a hydraulic system. The ECU 120 controls the power source 138 in accordance with the signals received from the torque sensor 116. Control signals for the power source 138 are transmitted from the ECU 120 to the power source 138 via the data network 118.

The illustrated power source 138 and the ball nut assembly 102 are operatively connected by a pulley assembly 140. The pulley assembly 140 includes a belt transmitting rotational power between an output of the power source 138 and a ball nut 142 of the ball nut assembly 102. The pulley assembly 140 includes a pulley (not shown) that is rotated by the belt. The pulley is rotationally fixed to the ball nut 142. Alternatively, the power source 138 may be operatively connected to the ball nut assembly 102 by a force transmission means other than the pulley assembly 140.

The ball nut 142 is operatively connected with the inner screw portion 130 of the steering member 126 in a known manner. As illustrated, the ball nut 142 has a second or outer screw portion 144. The outer screw portion has an internal screw thread convolution. Force transmitting members (not shown) are held in a track, defined by the inner screw portion 130 and the outer screw portion 144, to operatively connect the ball nut 142 with the steering member 126. As a non-limiting example, the force transmitting members may be ball bearings. Alternatively, the ball nut 142 may be operatively connected with the steering member 126 other than as illustrated.

The ball nut 142 effects the linear movement of the steering member 126 upon rotation of the steering wheel 112. As discussed, the power source 138 is operated in response to rotation of the steering wheel 112 and the ball nut assembly 102 is driven by the power source 138 via the pulley assembly 140. When the ball nut 142 is driven, the ball nut 142 rotates and, because the ball nut 142 is axially fixed in position on the housing design axis 134, the steering member 126 moves linearly along the housing design axis 134. The linear movement of the steering member 126 effects steering movement of the first and second steerable wheels 108A and 108B, respectively, of the vehicle. The power source 138 thus provides steering assistance in response to the applied steering torque.

In the event of an inability of the power source 138 to effect the linear movement of the steering member 126, a mechanical connection between the pinion teeth on the pinion gear 124 and the rack teeth on the rack portion 128 of the steering member 126 permits manual steering of the vehicle. The pinion gear 124 and the rack portion 128 cooperate to convert rotation of the steering wheel 112 around the steering axis 114 into linear movement of the steering member 126 along the housing design axis 134.

Referring now to FIGS. 3-6B, the bearing structure 136 is illustrated in detail. The bearing structure 136 includes an "outer" insert 146 and an "inner" annular extension portion 148 of the ball nut 142. The insert 146 has a center opening 152 (best shown in FIGS. 5A and 5B) in which the ball nut extension portion 148 is positioned. The bearing structure 136 further includes a retention member 150 that retains the insert 146 in the housing 104.

Figure 3:
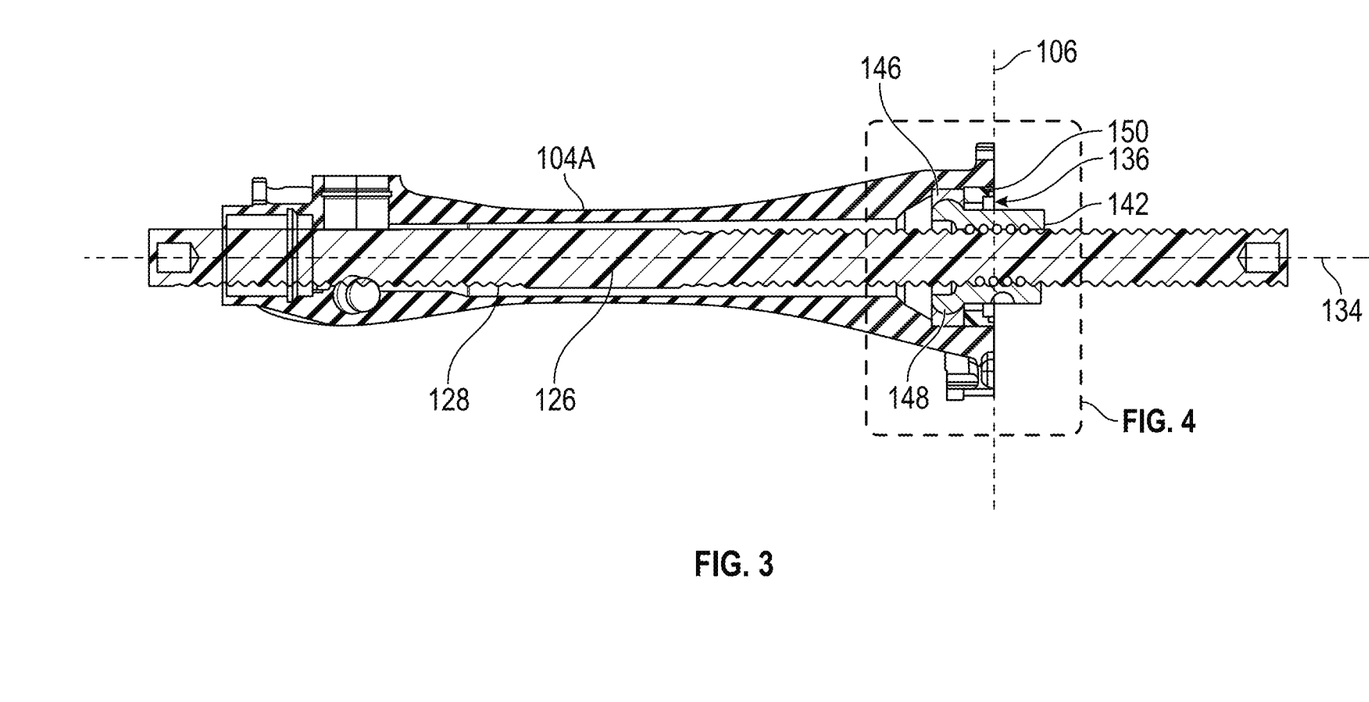
FIG. 3 is a detailed section view including the bearing structure of FIG. 1.
Figure 4:
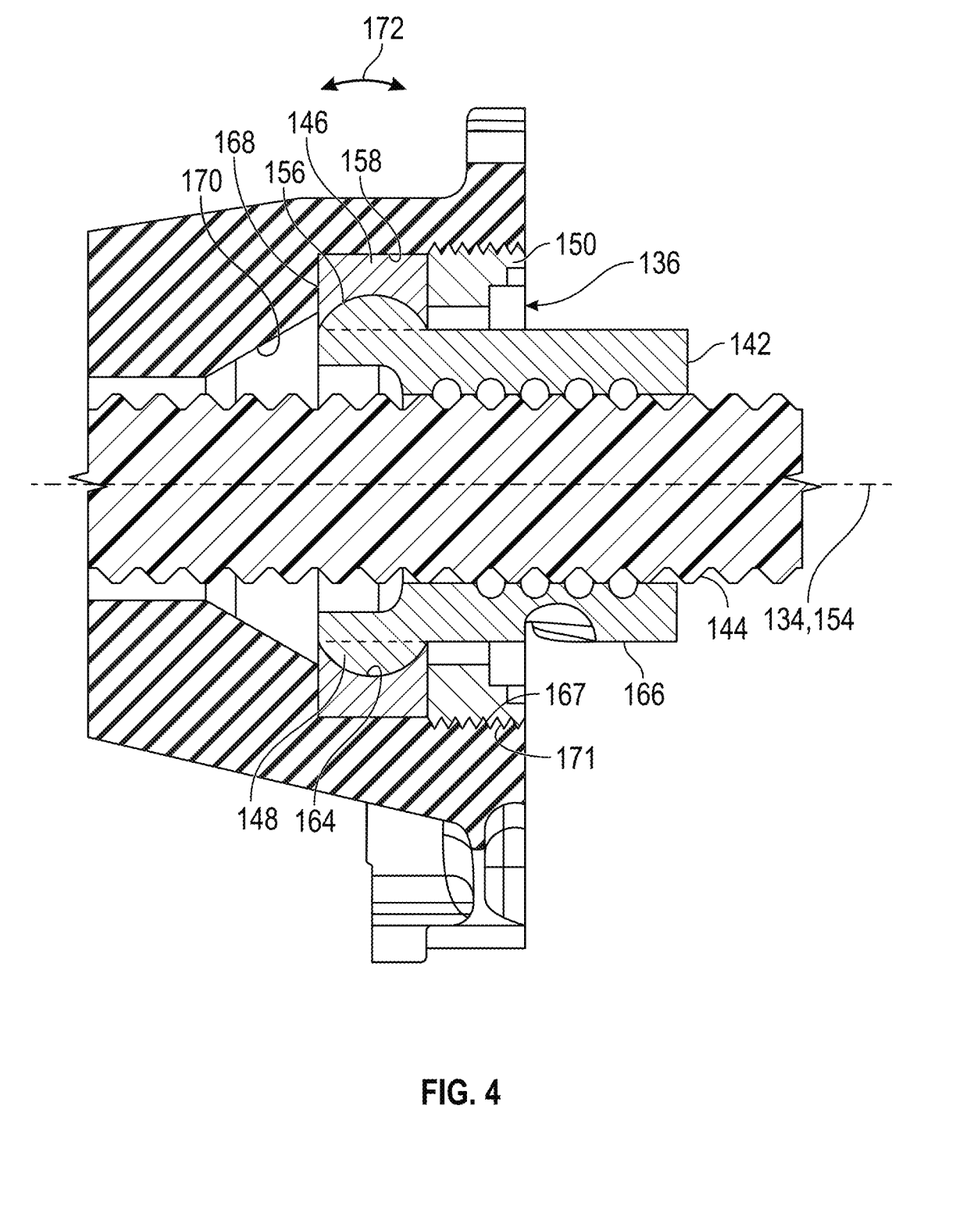
FIG. 4 is an enlarged portion of FIG. 3.

The ball nut 142 extends cylindrically along a longitudinal ball nut axis 154. The extension portion 148 is fixed in position on the ball nut 142 along the ball nut axis 154. The steering member 126 also extends along the ball nut axis 154. As discussed, the ball nut 142 rotates on the steering member 126 to produce linear movement of the steering member 126 along the ball nut axis 154 and the housing design axis 134.

In FIGS. 3 and 4, the ball nut axis 154 is illustrated as co-linear with the housing design axis 134. The ball nut axis 154 being co-linear with the housing design axis 134 is an ideal or design position of the ball nut axis 154 relative to the housing design axis 134. As will be discussed, the ball nut axis 154 and housing design axis 134 are commonly other than co-linear because of allowable tolerances in production and assembly of the housing 104.

Figure 5A:
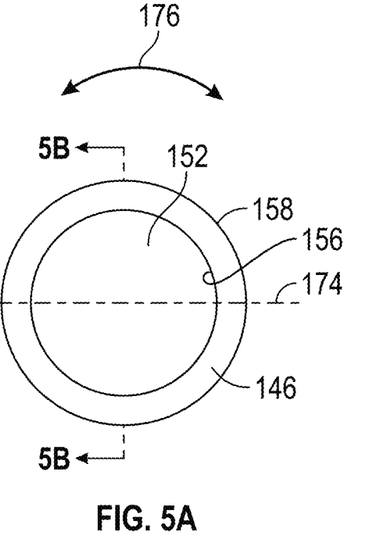
FIGS. 5A and 5B are an elevation and section view, respectively, of an insert of the bearing structure of FIG. 1.
Figure 5B:
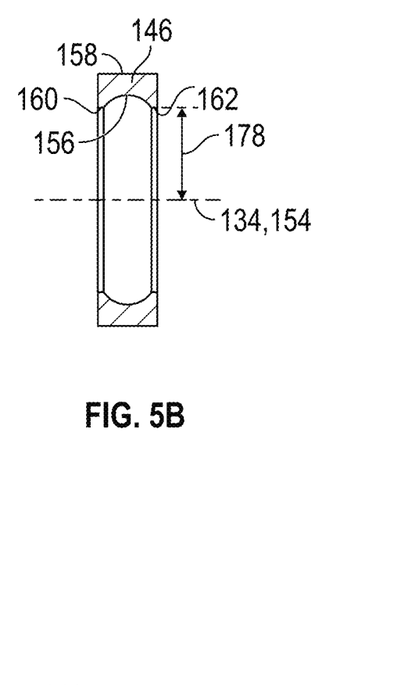

The insert 146 defines an inner bearing surface 156 and an outer bearing surface 158. The center opening 152 is defined by the insert inner bearing surface 156. As illustrated, the insert inner bearing surface 156 has a concave shape along the housing design axis 134. Preferably, the concave insert inner surface 156 has a constant radius. As a non-limiting example, the concave insert inner surface 156 may have a radius of 10.65 millimeters. The insert outer bearing surface 158 has a linear shape that is parallel to the housing design axis 134. Alternatively, the insert outer bearing surface 158 may have other than a linear shape along the housing design axis 134. The insert outer bearing surface 158 supports the ball nut 142 on the housing 104.

The insert 146 has an annular shape that extends around the housing design axis 134 and the ball nut 142. The insert 146 is defined by revolving the insert concave inner and linear outer surfaces 156 and 158, respectively, around the housing design axis 134 while both the concave insert inner surface 156 and linear insert outer bearing surface 158 are coplanar with the housing design axis 134.

Preferably, the insert 146 further has first and second insert portions 160 and 162, respectively, that extend annularly around the housing design axis 134. Preferably, the first and second insert portions 160 and 162, respectively, are parallel to the housing design axis 134 and/or the insert outer bearing surface 158. The concave insert inner surface 156 is interspaced between the first and second insert portions 160 and 162, respectively. Alternatively, one or both of the first and second insert portions 160 and 162, respectively, may be omitted.

Preferably, the insert 146 is produced from a polymer material. As a non-limiting example, the polymer material may be rubber. Producing the insert 146 from a polymer material reduces friction with the extension portion 148 as well as reduces overall noise, vibration, and harshness of the bearing structure 136, ball nut assembly 102, and vehicle power steering assembly 100. Alternatively, the insert 146 may be produced from other materials such as a metallic material such as steel or aluminum or a polyethylene material. As a further non-limiting example, the insert 146 may be produced from a nylon material. Alternatively, the insert 146 may be produced from a combination of materials such as rubber or a metal material coated with polyethylene material. As illustrated, the insert 146 is a solid member although such is not necessary.

Furthermore, the insert 146 is illustrated as a continuous annular shape. Alternatively, the insert 146 may be other than a continuous annular shape. As a non-limiting example, the insert 146 may comprise two or more annular segments or sub-members (not shown). Gaps may or may not be provided between the two or more annular segments or sub-members.

Figure 6A:
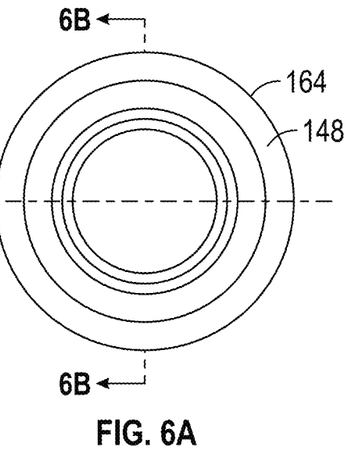
FIGS. 6A and 6B are an elevation and section view, respectively, of a ball nut having an extension portion of the bearing structure of FIG. 1.
Figure 6B:
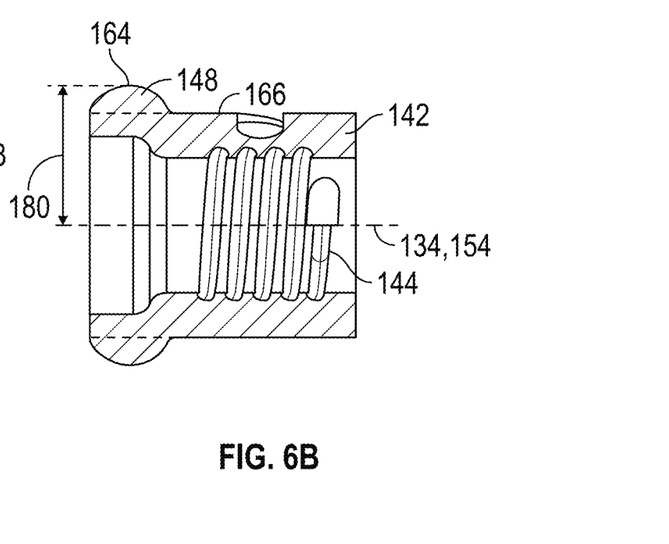

The extension portion 148 of the ball nut 142 defines an outer bearing surface 164. The extension outer surface 164 has a convex shape that is complementary to a shape of the concave inner surface 156 of the insert 146. As illustrated, the extension outer surface 164 has a convex shape extending along the housing design axis 134. The extension portion 148 extends from an external surface 166 of the ball nut 142 such that the extension portion 148 is defined between the convex extension outer surface 164 and the external surface 166 (shown by dashed lines at the extension portion 148). The convex extension outer surface 164 extends from the external surface 166 of the ball nut 142 in a radially outward direction from the housing design axis 134 and the ball nut axis 154. Preferably, the convex extension outer surface 164 extends from an end of the ball nut 142.

The extension portion 148 has an annular shape that extends around the housing design axis 134 and the ball nut 142. The extension portion 148 is defined by revolving the convex extension outer surface 164 around the housing design axis 134 while the convex extension outer surface 164 is coplanar with the housing design axis 134.

The extension portion 148 is rigidly secured to, or otherwise fixed in position on, the ball nut 142. Preferably, the extension portion 148 is produced monolithically or integrally with the ball nut 142 when the ball nut 142 is formed. As a non-limiting example, the extension portion 148 may be produced when the ball nut 142 is cold formed from a metallic material such as steel. As such, the extension portion 148 is produced from the same material as the ball nut 142. Alternatively, the extension portion 148 may be a separate member that is fastened, attached, or otherwise secured to the ball nut 142. As a non-limiting example, the extension portion 148 may be produced from a polymer material, such as rubber, and secured to the external surface 166 of the ball nut 142. As further non-limiting examples, the extension portion 148 may be produced form a metallic material or a polyethylene material and secured to the external surface 166.

As discussed, the bearing structure 136 further includes the retention member 150 to retain the insert 146 in the housing 104. Preferably, the retention member 150 is an annular ring having first threads 167. As a non-limiting example, the retention member 150 may be a spanner nut. Alternatively, the retention member 150 may be other than a threaded ring. As a non-limiting example, the retention member may be a spring loaded snap ring.

The bearing structure 136 is preferably assembled by first positioning the concave insert inner surface 156 on the convex extension outer surface 164. Specifically, the extension portion 148 is inserted in the center opening 152 such that the insert 146 is supported on the extension portion 148. As a non-limiting example, when the insert 146 is produced from an elastic material such as rubber, the insert 146 may be stretched to allow the extension portion 148 to enter the center opening 152 and then released to be supported on the extension portion 148. Alternatively, as previously discussed, the insert 146 may be produced as two or more annular segments or sub-members that are arranged or otherwise assembled around the extension portion 148 to form the insert 146. Alternatively, the concave insert inner surface 156 may be positioned on the convex extension outer surface 164 other than as described.

Next, after the concave insert inner surface 156 is positioned on the convex extension outer surface 164, the insert 146 is positioned in a recess 168 on an inner surface 170 of the housing 104. As illustrated, the recess 168 is an annular step in the housing 104 but may be otherwise shaped. As a non-limiting example, the recess 168 may be a machined counter bore. Alternatively, the insert 146 may be positioned in the housing 104 in other than the recess 168 and/or the recess 168 may be other than a machined counter bore.

Lastly, after the insert 146 is positioned in the recess 168, the retention member 150 is installed in the housing 104 to retain the insert 146 in the recess 168. Preferably, when installed in the housing 104, the retention member 150 abuts or otherwise axially supports or contacts the insert 146 to retain the insert 146 in the recess 168.

When the retention member 150 is provided with the first threads 167, the retention member 150 is preferably screwed onto second threads 171 provided on the housing inner surface 170. The retention member 150 with the first threads 167 is preferably screwed onto the second threads 171 tight against the insert 146. Alternatively, when the retention member 150 is provided other than with the first threads, such as when the retention member 150 is the spring loaded snap ring, the retention member 150 is installed in the housing 104 by suitable means.

Alternatively, the bearing structure 136 may be installed in the housing 104 other than as described herein. As a non-limiting example, threads may be provided on the insert outer bearing surface 158 such that the insert 146 is retained in the recess 168 by screwing the insert 146 into the housing 104. In such a case, the retention member 150 may be omitted.

When the bearing structure 136 is assembled, the convex extension outer surface 164 and the concave insert inner surface 156 are in contact such that the convex extension outer surface 164 bears, rests, or is otherwise supported on, the concave insert inner surface 156. This is because of the complementary shapes between the convex extension outer surface 164 and the concave insert inner surface 156. The convex extension outer surface 164 is free to oscillate, rotate, slide, or otherwise move on the concave insert inner surface 156.

The convex extension outer surface 164 bearing on the concave insert inner surface 156 forms a plain bearing. As used herein, "plain bearing" is meant to mean a bearing comprising only a bearing surface without any rolling elements—e.g., ball bearings. Instead of rolling elements, the concave insert inner surface 156 and the convex extension outer surface 164 slide on each other. There are no rolling force transmitting elements, ball bearings or otherwise, in the bearing structure 136. The plain bearing may also be known as a sliding bearing or slide bearing to those skilled in the art.

Preferably, and as illustrated, the contact between the convex extension outer surface 164 and the concave insert inner surface 156 is direct contact between the convex extension outer surface 164 and the concave insert inner surface 156. Alternatively, a damping material(s) may be provided between the convex extension outer surface 164 and the concave insert inner surface 156 as part of the plain bearing. As a non-limiting example, the damping material may be formed from a polymer or nylon material. When the damping material is provided, one of the convex extension outer surface 164 or the concave insert inner surface 156 slides on the damping material.

The convex extension outer surface 164 oscillates or rotates on the concave insert inner surface 156 along a first rotation arc 172 to provide relative rotation between the insert 146 and the extension portion 148. The convex extension outer surface 164 oscillating or rotating on the concave insert inner surface 156 also provides relative rotation between the ball nut assembly 102 and the housing 104. This is because, as discussed, the extension portion 148 is rigidly secured to the ball nut 142 of the ball nut assembly 102. Alternatively, the insert inner surface 156 and the extension outer surface 164 may be shapes other than those illustrated—i.e., other than concave and convex shapes, respectively—that allow the extension outer surface 164 to oscillate or rotate on the insert inner surface 156.

The first rotation arc 172 is in a plane. The housing design axis 134 and the ball nut axis 154 also both lie in the plane. The convex extension outer surface 164 rotating on the concave insert inner surface 156 results in the ball nut assembly 102 rotating on a rotation axis 174 (also shown in FIG. 2) while the housing 104 remains in position—i.e., the housing 104 is rotationally fixed on the rotation axis 174. The housing design axis 134, ball nut axis 154, and rotation axis 174 all intercept at a single point.

Preferably, the rotation axis 174 is perpendicular to the ball nut axis 154. The rotation axis 174 is not limited to a single or specific perpendicular orientation to the housing design axis 134. In FIG. 5A, the rotation axis 174 may be oriented anywhere between 0 and 360 degrees about the housing design axis 134. A specific orientation of the rotation axis 174 to the housing design axis 134 is preferably a result of allowable tolerances in production and assembly of the housing 104—i.e., the specific orientation of the rotation axis 174 to the housing design axis 134 results from the deviation of the as-built axis of the housing 104 from the housing design axis 134. Thus, the bearing structure 136 supports the ball nut assembly 102 on the housing while allowing the ball nut assembly 102 to rotate about multiple axes. Alternatively, the rotation axis 174 may be otherwise transverse to the ball nut axis 154.

Rotation of the ball nut assembly 102 on the rotation axis 174 results in different portions of the convex extension outer surface 164 oscillating or rotating in different directions along the first rotation arc 172. For example, a first portion of the convex extension outer surface 164 illustrated as above the ball nut axis 154 in FIG. 4 may oscillate or rotate in a first direction along the first rotation arc 172 and a second portion of the convex extension outer surface 164 illustrated as below the ball nut axis 154 in FIG. 4 may oscillate or rotate in a second direction along the first rotation arc 172 that is opposite the first direction.

As such, a position of the ball nut assembly 102 may "float," pitch, move, oscillate, or otherwise be adjusted relative to the housing 104. Such float may, as a non-limiting example, be used to properly align the components—e.g., the steering member 126—of the vehicle power steering assembly 100 in the housing 104 during assembly of the vehicle power steering assembly 100. Alignment of the steering member 126 in the housing 104 may result in the ball nut assembly 102 oscillating, rotating, or pitching on the rotation axis 174 and the convex extension outer surface 164 oscillating or otherwise rotating on the concave insert inner surface 156. The ball nut assembly 102 oscillates, rotates, or floats such that the components of the vehicle power steering assembly 100 may align with the as-built axis of the housing 104 during assembly of the vehicle power steering assembly 100.

Preferably at the same time, as the convex extension outer surface 164 oscillates or rotates on the concave insert inner surface 156, the ball nut 142 also rotates on the steering member 126 to effect the linear movement of the steering member 126. The ball nut 142 rotates on the steering member 126 while supported by the bearing structure 136—i.e., by the convex extension outer surface 164 being supported on the concave insert inner surface 156. When rotating on the steering member 126, the ball nut 142 rotates on the ball nut axis 154. The ball nut 142 rotates on the steering member 126 along a second rotation arc 176 that is substantially perpendicular to the ball nut axis 154.

The convex extension outer surface 164 being positioned within the concave shape of the concave insert inner surface 156 also axially restrains the ball nut 142 in position on the housing design axis 134 to effect the linear movement of the steering member 126 when the ball nut 142 is rotated. When the first and second insert portions 160 and 162, respectively, are provided, the convex extension outer surface 164 is preferably positioned in the concave shape of the concave insert inner surface 156 between the first and second insert portions 160 and 162, respectively.

Preferably, portions of the concave insert inner surface 156 closest to the ball nut axis 154 when the ball nut assembly 102 is assembled have a radial minimal distance 178 from the ball nut axis 154. Preferably, the portions of the concave insert inner surface 156 with the radial minimal distance 178 adjoin or abut the first and second insert portions 160 and 162, respectively. The radial minimal distance 178 is preferably perpendicular to the ball nut axis 154.

Also preferably, a portion of the convex extension outer surface 164 furthest from the ball nut axis 154 when the ball nut assembly 102 is assembled has a radial maximal distance 180 from the ball nut axis 154. The radial maximal distance 180 is preferably also perpendicular to the ball nut axis 154.

An absolute value of the radial maximal distance 180 is preferably greater than an absolute value of the radial minimal distance 178. As illustrated, the first and second insert portions 160 and 162, respectively, have the same radial minimal distance 178. Alternatively, the first and second insert portions 160 and 162, respectively, may have different values that are each, as absolute values, preferably less than the radial maximal distance 180. As such, the ball nut 142 may be axially restrained on the housing design axis 134.

Figure 7:
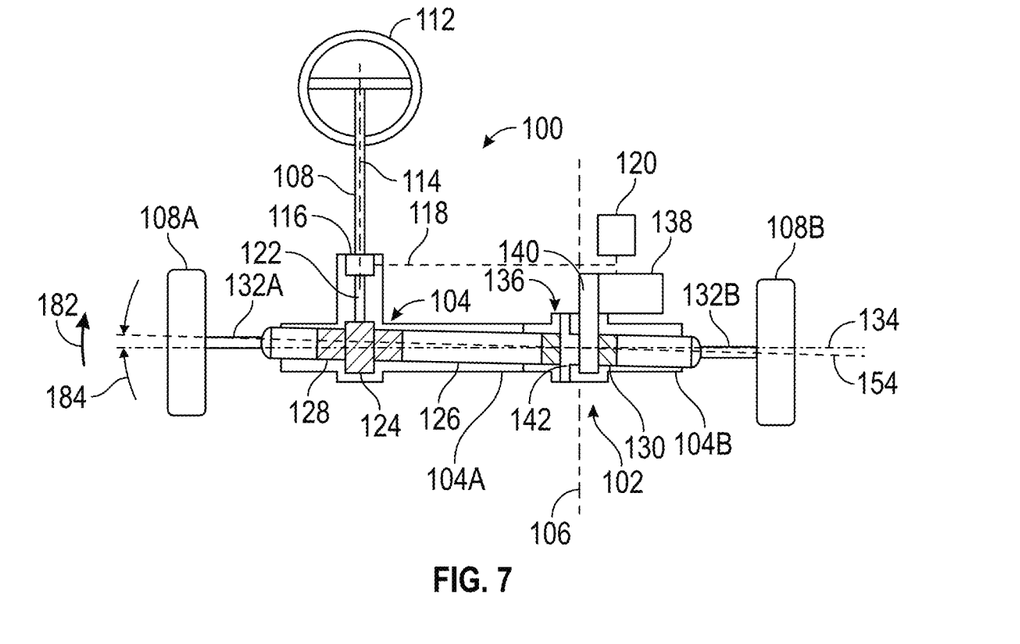
FIG. 7 is a schematic view of the vehicle power steering assembly of FIG. 1 with the ball nut assembly in a first position.
Figure 8:
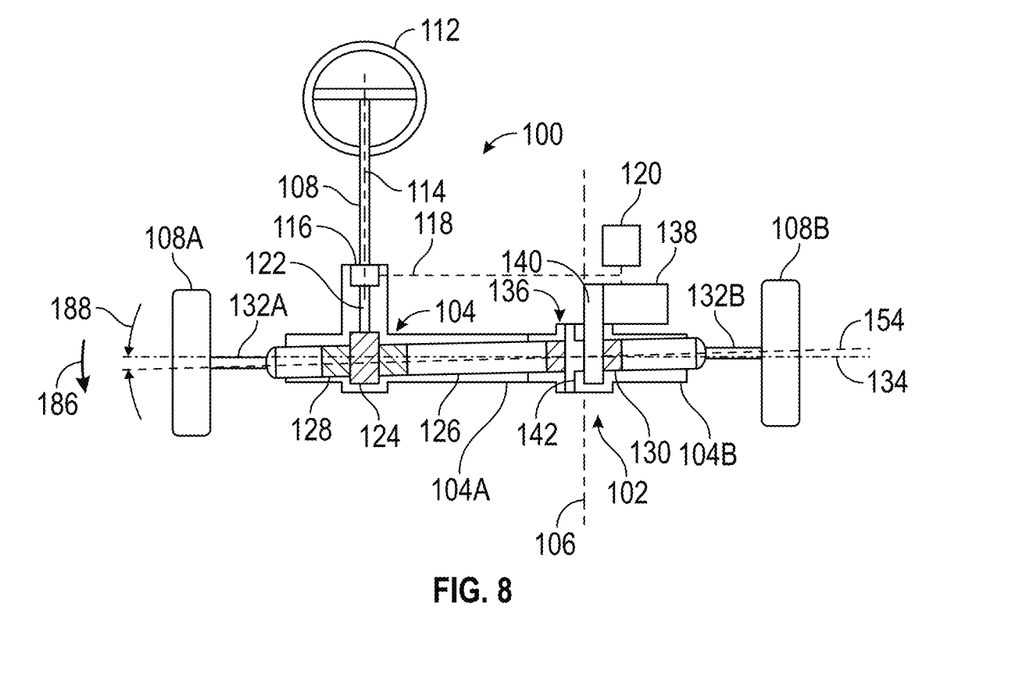
FIG. 8 is a schematic view of the vehicle power steering assembly of FIG. 1 with the ball nut assembly in a second position.

Referring now to FIGS. 7 and 8, there is illustrated non-limiting example positions of the ball nut assembly 102 when the convex extension outer surface 164 of the ball nut 142 has oscillated or rotated on the concave insert inner surface 156. FIGS. 7 and 8 are schematic and oscillation or rotation of the steering member 126 and the ball nut assembly 102 is exaggerated for clarity.

Specifically, FIG. 7 illustrates the position of the ball nut assembly 102 when the convex extension outer surface 164 has oscillated or rotated on the concave insert inner surface 156 in a first direction 182. In FIG. 5, the steering member 126 and the ball nut assembly 102 have rotated together. As a result, the housing design axis 134 and the ball nut axis 154 are no longer co-linear. Instead, there is a first deflection or pitch 184 between the housing design axis 134 and the ball nut axis 154 such that the components of the vehicle power steering assembly 100 may align with the as-built axis of the housing 104 during assembly of the vehicle power steering assembly 100. As a non-limiting example, the first deflection 184 may have an absolute value of 0.5 degrees.

Similarly, FIG. 8 illustrates the position of the ball nut assembly 102 when the convex extension outer surface 164 has oscillated or rotated on the concave insert inner surface 156 in a second direction 186, wherein the second direction 186 is opposite the first direction 182. Again, in FIG. 6, the steering member 126 and the ball nut assembly 102 have rotated together. As a result, the housing design axis 134 and the ball nut axis 154 are again no longer co-linear. Instead, there is a second deflection or pitch 188 between the housing design axis 134 and the ball nut axis 154 such that the components of the vehicle power steering assembly 100 may align with the as-built axis of the housing 104 during assembly of the vehicle power steering assembly 100. As a non-limiting example, the second deflection 188 may have an absolute value of 0.5 degrees, wherein the first and second deflections 184 and 188, respectively, have opposite magnitudes.

FIGS. 7 and 8 show examples of the ball nut axis 154 rotated relative to the housing design axis 134 in a vertical plane extending between top and bottom of the vehicle having the vehicle power steering assembly 100. Alternatively, the ball nut axis 154 may rotate relative to the housing design axis 134 in a plane with any direction or orientation. As a non-limiting example, the ball nut axis 154 may rotate relative to the housing design axis 134 in a horizontal plane extending between front and back of the vehicle.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A vehicle power steering assembly comprising:
a housing;
a ball nut configured to be operatively disposed in the housing, the ball nut including an extension portion provided with a convex outer bearing surface; and
an insert supported on the housing, the insert provided with a concave inner bearing surface, wherein the concave inner bearing surface is complementary to the convex outer bearing surface and the convex outer bearing surface and concave inner bearing surface are configured to provide relative sliding movement between the convex outer bearing surface and the concave inner bearing surface, the convex outer bearing surface supported on the concave inner bearing surface axially restraining the ball nut along an axis of the ball nut.

2. The vehicle power steering assembly of claim 1 wherein the concave inner bearing surface is in contact with the convex outer bearing surface and the concave inner bearing surface and the convex outer bearing surface slide on each other.

3. The vehicle power steering assembly of claim 1 wherein the concave inner bearing surface and the convex outer bearing surface are a plain bearing.

4. The vehicle power steering assembly of claim 1 wherein the extension portion is formed integrally with the ball nut.

5. The vehicle power steering assembly of claim 1 wherein the extension portion extends radially outward from an end of the ball nut.

6. The vehicle power steering assembly of claim 1 wherein the insert is formed of a polymer material.

7. The vehicle power steering assembly of claim 1 further comprising:
a retention member configured to retain the insert in the housing.

8. A vehicle power steering assembly comprising:
a housing;
a ball nut configured to be operatively disposed in the housing, the ball nut including an extension portion provided with a convex bearing surface;
an insert supported on the housing, the insert provided with a concave bearing surface wherein the concave bearing surface is complementary to the convex bearing surface; and
a ball nut axis of the ball nut on which the ball nut is configured to rotate to effect linear motion of a steering member, wherein the convex and concave bearing surfaces are configured to provide sliding movement relative to each other to provide relative rotation between the convex and concave bearing surfaces in a first direction on the ball nut axis and a second direction on a rotation axis that is transverse to the ball nut axis, the concave bearing surface supported on the convex bearing surface axially restraining the ball nut along the ball nut axis.

9. The vehicle power steering assembly of claim 8 wherein the rotation axis is perpendicular to the ball nut axis.

10. The vehicle power steering assembly of claim 8 wherein the concave bearing surface is in contact with the convex bearing surface and the concave bearing surface and the convex bearing surface slide on each other.

11. The vehicle power steering assembly of claim 8 wherein the concave bearing surface and the convex bearing surface are a plain bearing.

12. The vehicle power steering assembly of claim 8 wherein the extension portion is formed integrally with the ball nut.

13. The vehicle power steering assembly of claim 8 wherein the extension portion extends radially outward from an end of the ball nut.

14. The vehicle power steering assembly of claim 8 wherein the insert is formed of a polymer material.

15. The vehicle power steering assembly of claim 8 further comprising:
a retention member configured to retain the insert in the housing.

16. A vehicle power steering assembly comprising:
a housing;
a recess in the housing;
a ball nut configured to be operatively disposed in the housing, wherein the ball nut has a ball nut axis on which the ball nut is configured to rotate to effect linear motion of a steering member and the ball nut includes an extension portion provided with a convex bearing surface, wherein the extension portion is formed integrally with the ball nut and extends radially outward from an end of the ball nut;
an insert supported in the recess, the insert provided with a concave bearing surface, wherein the concave bearing surface is complementary to the convex bearing surface and the convex and concave bearing surfaces are a plain bearing that provides relative rotation between the convex and concave bearing surfaces in a first direction on the ball nut axis and a second direction on a rotation axis that is transverse to the ball nut axis, the convex bearing surface supported on the concave bearing surface axially restraining the ball nut along the ball nut axis; and
a retention member configured to retain the insert in the recess.

17. The vehicle power steering assembly of claim 16 wherein the concave bearing surface is in sliding contact with the convex bearing surface.

* * * * *